United States Patent
Wils et al.

(10) Patent No.: US 11,163,446 B1
(45) Date of Patent: Nov. 2, 2021

(54) SYSTEMS AND METHODS OF AMORTIZING DELETION PROCESSING OF A LOG STRUCTURED STORAGE BASED VOLUME VIRTUALIZATION

(71) Applicant: EMC IP Holding Company LLC, Hopkinton, MA (US)

(72) Inventors: Joris J. M. Wils, Acton, MA (US); Richard P. Ruef, Santa Cruz, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 320 days.

(21) Appl. No.: 15/664,852

(22) Filed: Jul. 31, 2017

(51) Int. Cl.
*G06F 3/06* (2006.01)
*G06F 16/27* (2019.01)
*G06F 16/22* (2019.01)
*G06F 16/23* (2019.01)

(52) U.S. Cl.
CPC .......... *G06F 3/0608* (2013.01); *G06F 3/0619* (2013.01); *G06F 3/0641* (2013.01); *G06F 3/0665* (2013.01); *G06F 3/0689* (2013.01); *G06F 16/2246* (2019.01); *G06F 16/2358* (2019.01); *G06F 16/2386* (2019.01); *G06F 16/275* (2019.01)

(58) Field of Classification Search
None
See application file for complete search history.

(56) References Cited

U.S. PATENT DOCUMENTS

| | | | |
|---|---|---|---|
| 5,832,515 A * | 11/1998 | Ledain | G06F 3/0619 |
| 6,611,852 B1 * | 8/2003 | Morley | G06F 3/0601 |
| 6,651,073 B1 * | 11/2003 | Lyle | G06F 11/1471 |
| 7,194,492 B2 | 3/2007 | Seidenberg et al. | |
| 7,752,392 B1 * | 7/2010 | Roy | G06F 3/061 370/402 |
| 8,862,818 B1 | 10/2014 | Ozdemir | |
| 9,720,601 B2 * | 8/2017 | Gupta | G06F 3/0635 |
| 9,740,422 B1 | 8/2017 | Ozdemir | |
| 9,753,813 B1 * | 9/2017 | Fan | G06F 11/1448 |
| 9,772,938 B2 * | 9/2017 | Talagala | G06F 12/0246 |

(Continued)

OTHER PUBLICATIONS

O'Neil et al.; "The Log-Structured Merge-Tree (LSM-Tree)" (Year: 1996).*

(Continued)

*Primary Examiner* — Ashish Thomas
*Assistant Examiner* — Mellissa M. Ohba
(74) *Attorney, Agent, or Firm* — BainwoodHuang

(57) ABSTRACT

Techniques for amortizing metadata updates due to data delete operations in data storage systems that implement log structured storage of data from virtual volumes. The techniques employ a segment database (DB) and a deleted chunk DB. The segment DB is implemented as a key-value store. The deleted chunk DB is likewise implemented as a key-value store, but configured as a log structured merge (LSM) tree. By configuring the deleted chunk DB as an LSM-tree, more efficient use of memory and improved reduction of metadata updates can be achieved. Stored segments of log structured data can also be effectively "cleaned" in a background process that involves ordered traversals of the segment DB and the deleted chunk DB, allowing for more efficient recovery of storage space consumed by the deleted data chunks.

20 Claims, 7 Drawing Sheets

(56) References Cited

U.S. PATENT DOCUMENTS

| | | | |
|---|---|---|---|
| 9,778,881 B2 | 10/2017 | Romanovskiy | |
| 9,785,366 B1 | 10/2017 | Morley et al. | |
| 9,846,711 B2* | 12/2017 | Borthakur | G06F 16/22 |
| 10,102,144 B2* | 10/2018 | Sundararaman | G06F 12/0269 |
| 10,191,813 B2* | 1/2019 | Fan | G06F 11/1448 |
| 10,210,067 B1* | 2/2019 | Wils | G06F 11/3037 |
| 10,289,345 B1* | 5/2019 | Wils | G06F 12/0292 |
| 10,416,901 B1* | 9/2019 | Wils | G06F 12/063 |
| 2012/0159098 A1* | 6/2012 | Cheung | G06F 12/0261 |
| | | | 711/162 |
| 2017/0075781 A1* | 3/2017 | Bennett, Jr. | G06F 11/2069 |
| 2017/0364414 A1* | 12/2017 | Pogosyan | G06F 11/1453 |
| 2018/0089244 A1* | 3/2018 | Velayudhan Pillai | |
| | | | G06F 16/221 |
| 2019/0155694 A1* | 5/2019 | Fan | G06F 11/1448 |

OTHER PUBLICATIONS

Ren et al., "IndexFS: Scaling File System Metadata Performance with Stateless Caching and Bulk Insertion;" Proceedings of the International Conference for High Performance Computing, Networking, Storage and Analysis (Year: 2014).*

Ren et al., "TABLEFS: Enhancing Metadata Efficiency in the Local File System;" 2013 USENIX Annual Technical Conference (USENIX ATC '13) (Year: 2013).*

\* cited by examiner

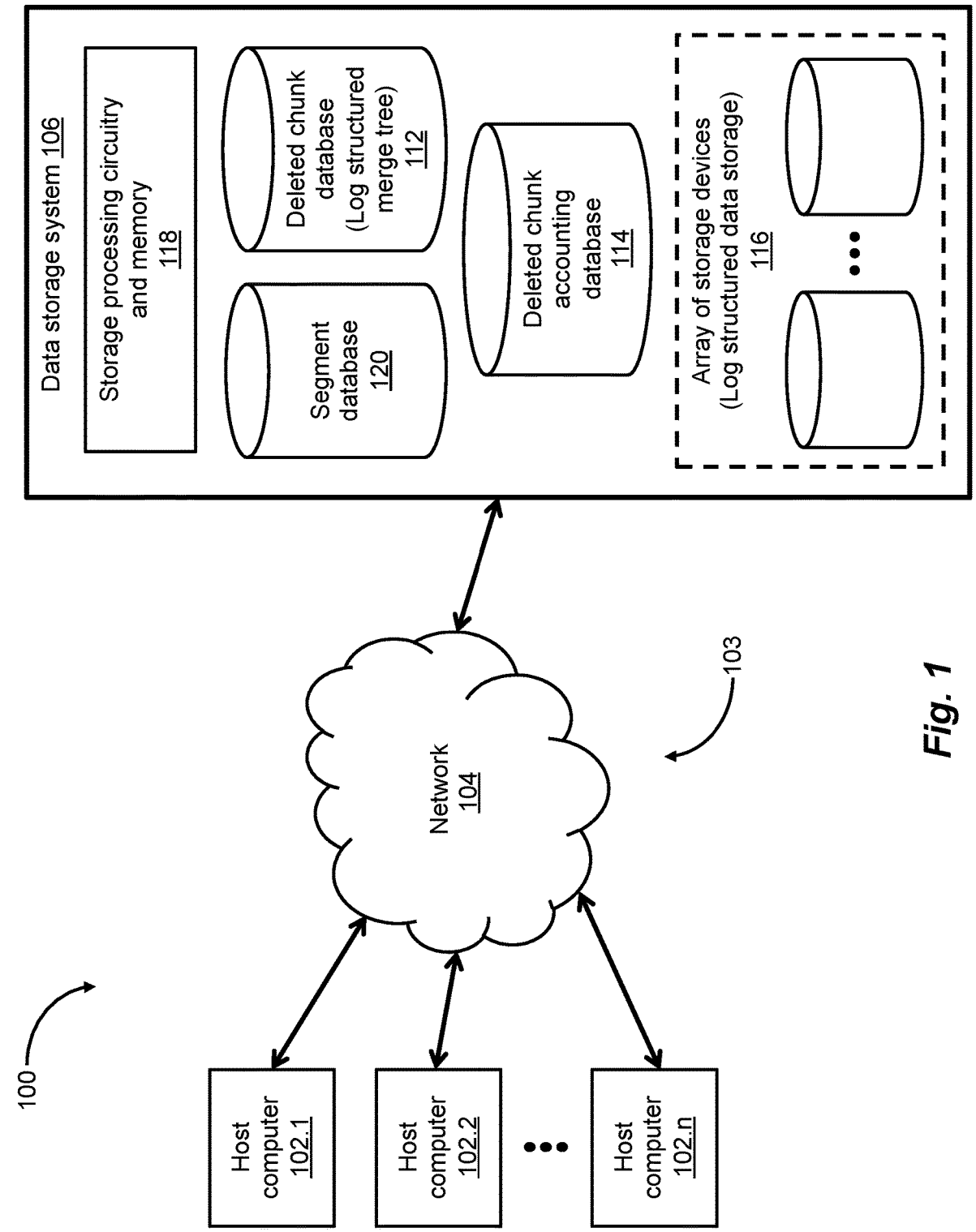

SYSTEMS AND METHODS OF AMORTIZING DELETION PROCESSING OF A LOG STRUCTURED STORAGE BASED VOLUME VIRTUALIZATION

BACKGROUND

Conventional data storage systems commonly employ log structured storage techniques for storing data from virtual volumes, which are addressable entities configured to store data in blocks. The data blocks are often compressed into chunks of data that are sequentially written onto fixed partitions of storage media called "segments." Relationships between the virtual volumes and addresses of data write operations to locations of corresponding data chunks on the respective segments are maintained in metadata. For solid state storage media such as solid state drives (SSDs), such metadata is typically logically arranged in addressable nodes of binary tree structures, which are stored on the SSDs along with the segments of sequentially written data chunks to obtain persistent storage of both the data segments and the metadata.

SUMMARY

In such conventional data storage systems, updates of the metadata are often amortized by aggregating any changes in data locations into as few binary tree nodes as possible. In this way, the number of metadata update operations relative to the number of data update operations in the data storage systems can be reduced. Such aggregation of data location changes due to data write operations can generally be readily obtained in data storage systems that employ log structured storage techniques because newly written data chunks are typically concentrated into a small number of segments, allowing the corresponding data location changes in the metadata to be aggregated and concentrated into a small number of binary tree nodes.

However, the aggregation of data location changes due to data delete operations can be problematic, particularly in the case where the total amount of metadata is large. For example, a data chunk may be deleted when its corresponding location in a virtual volume is overwritten or unmapped. Once such overwriting or unmapping of the data chunk location in the virtual volume occurs, no assumption can generally be made about the location of the deleted data chunk on any segment because its location on the segment is determined at the time the data chunk is written, which may have no correlation with the time the data chunk is subsequently deleted. As a result, deleted data chunks can become randomly spread over locations on a multitude of segments and potentially impact data location changes in the metadata associated with a large number of binary tree nodes, ultimately increasing the number of required metadata update operations as well as the overall cost of making the metadata updates.

Techniques are disclosed herein that can be used to amortize metadata updates due to data delete operations in data storage systems that implement log structured storage of data from virtual volumes. The disclosed techniques employ a segment database (DB) and a deleted chunk DB. The segment DB can be implemented as a key-value store. The deleted chunk DB can likewise be implemented as a key-value store, but is configured as a log structured merge (LSM) tree. By configuring the deleted chunk DB as an LSM-tree, more efficient use of memory and improved reduction of metadata updates can be achieved. In addition, stored segments of log structured data can be effectively "cleaned" in a background process that involves ordered traversals of the segment DB and the deleted chunk DB, allowing for more efficient recovery of storage space consumed by the deleted data chunks.

In certain embodiments, a method of amortizing metadata updates due to data delete operations in a data storage system includes sequentially writing a plurality of data chunks as log structured data onto at least one segment of storage media, and storing information pertaining to the at least one segment as at least one entry of a segment database. At least one data chunk among the plurality of data chunks is identified as being at least one deleted data chunk on the at least one segment, and metadata pertaining to the at least one deleted data chunk is stored as at least one entry of a deleted chunk database configured as a log structured merge (LSM) tree. The method further includes performing an ordered traversal of entries in each of the segment database and the deleted chunk database configured as the LSM-tree to identify at least one location of the at least one deleted data chunk on the at least one segment, and performing a segment clean operation to recover storage space on the at least one segment consumed by the at least one deleted data chunk.

A typical LSM-tree is a multi-level data structure. The data storage system includes a memory, and metadata tablets at a $0^{th}$ level of the data structure are located in the memory. The metadata pertaining to the deleted data chunk is inserted into a first metadata tablet at the $0^{th}$ level of the multi-level LSM-tree within the memory. Upon the first metadata tablet at the $0^{th}$ level of the multi-level LSM-tree reaching a predetermined size threshold, insertion of additional metadata pertaining to one or more deleted data chunks into the first metadata tablet is prohibited, and the additional metadata is inserted into a second metadata tablet at the $0^{th}$ level of the multi-level LSM-tree within the memory. Further, upon the second metadata tablet at the $0^{th}$ level of the multi-level LSM-tree reaching the predetermined size threshold, a data merge operation is performed on the first and second metadata tablets within the memory to form a third metadata tablet at a $1^{st}$ level of the multi-level LSM-tree. A data flush operation is performed on the third metadata tablet at the $1^{st}$ level of the multi-level LSM-tree to migrate the third metadata tablet from the memory to persistent storage of the deleted chunk database, and the first and second metadata tablets are discarded from the memory.

In certain embodiments, a system for amortizing metadata updates due to data delete operations in a data storage system includes storage processing circuitry, a memory, a segment database, a deleted chunk database configured as a log structured merge (LSM) tree, and an array of storage devices configured for log structured data storage. The storage processing circuitry is operative to execute a computer program out of the memory (1) to sequentially write a plurality of data chunks as log structured data onto at least one segment of the array of storage devices, (2) to store information pertaining to the at least one segment as at least one entry of the segment database, (3) to identify at least one data chunk among the plurality of data chunks as being at least one deleted data chunk on the at least one segment, (4) to store metadata pertaining to the at least one deleted data chunk as at least one entry of the deleted chunk database configured as the LSM-tree, (5) to perform an ordered traversal of entries in each of the segment database and the deleted chunk database configured as the LSM-tree to identify at least one location of the at least one deleted data chunk on the at least one segment, and (6) to perform a segment clean operation to recover storage space on the at least one segment consumed by the at least one deleted data chunk.

Other features, functions, and aspects of the invention will be evident from the Detailed Description that follows.

BRIEF DESCRIPTION OF THE DRAWINGS

The foregoing and other aspects, features, and advantages will be apparent from the following description of particular embodiments of the invention, as illustrated in the accompanying drawings in which like reference numerals and characters refer to the same parts throughout the different views.

FIG. 1 is a block diagram of an exemplary environment in which an exemplary data storage system configured to amortize metadata updates due to data delete operations can be employed;

FIG. 2 is a diagram of an exemplary segment database entry for a segment database (DB) included in the data storage system of FIG. 1;

FIG. 3 is a diagram of an exemplary deleted chunk database entry for a deleted chunk database (DB) included in the data storage system of FIG. 1;

DETAILED DESCRIPTION

Figure 4A:
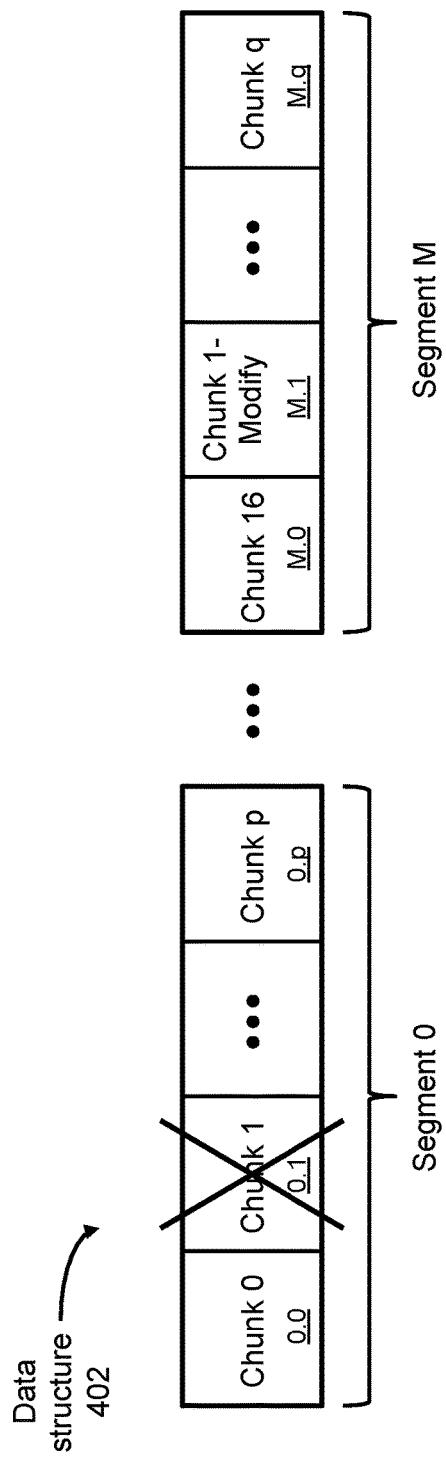
FIG. 4a is a diagram of an exemplary data structure of segments containing in-use ("active") data chunk(s) and/or free ("deleted") data chunk(s) sequentially written to log structured storage within the data storage system of FIG. 1.

Techniques are disclosed herein that can be used to amortize metadata updates due to data delete operations in data storage systems that implement log structured storage of data from virtual volumes. The disclosed techniques employ a segment database (DB) and a deleted chunk DB. The segment DB can be implemented as a key-value store. The deleted chunk DB can likewise be implemented as a key-value store, but is configured as a log structured merge (LSM) tree. By configuring the deleted chunk DB as an LSM-tree, more efficient use of memory and improved reduction of metadata updates can be achieved. In addition, stored segments of log structured data can be effectively "cleaned" in a background process that involves ordered traversals of the segment DB and the deleted chunk DB, allowing for more efficient recovery of storage space consumed by the deleted data chunks.

FIG. 1 depicts an illustrative embodiment of an exemplary data storage environment 100, in which an exemplary data storage system 106 configured to amortize metadata updates due to data delete operations can be employed. As shown in FIG. 1, the data storage environment 100 includes a plurality of host computers 102.1, 102.2, . . . , 102.n communicably coupled to the data storage system 106 by a communications medium 103 that includes a network 104. For example, each of the plurality of host computers 102.1, 102.2, . . . , 102.n can be configured as a web server computer, a file server computer, an email server computer, an enterprise server computer, and/or any other suitable computer or computerized device for providing input/output (I/O) requests (e.g., small computer system interface (SCSI) commands) to the data storage system 106 over the communications medium 103. Such I/O requests provided by the plurality of host computers 102.1, 102.2, . . . , 102.n can direct the data storage system 106 to store and/or retrieve blocks of data from virtual volumes on behalf of the respective host computers 102.1, 102.2, . . . , 102.n.

The communications medium 103 can be configured to interconnect the plurality of host computers 102.1, 102.2, . . . , 102.n and the data storage system 106 to enable these components to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper based data communications devices and cabling, fiber optic devices and cabling, wireless devices, or any suitable combination thereof. In addition, the communications medium 103 can be configured to support storage area network (SAN) based communications, local area network (LAN) based communications, cellular communications, wide area network (WAN) based communications, distributed infrastructure communications, and/or any other suitable communications.

As further shown in FIG. 1, the data storage system 106 can include storage processing circuitry and memory 118, a plurality of databases such as a segment database (DB) 120, a deleted chunk database (DB) 112, and a deleted chunk accounting database (DB) 114, and an array of storage devices 116. The storage processing circuitry and memory 118 can include volatile memory (e.g., dynamic random access memory (DRAM), static random access memory (SRAM)) and/or non-volatile memory (e.g., flash memory, magnetic memory), and can accommodate a variety of software constructs including, but not limited to, operating system code and data, data storage system code and data, and metadata update amortization code and data. The storage processing circuitry and memory 118 can further include one or more physical storage processors or engines, data movers, director boards, blades, I/O modules, storage drive controllers, switches, and/or any other suitable computer hardware or combination thereof. For example, the storage processing circuitry and memory 118 can process the I/O requests from the plurality of host computers 102.1, 102.2, . . . , 102.n, and store host data as log structured data in a redundant array of independent disk (RAID) environment implemented by the array of storage devices 116.

During operation of the data storage system 106, the storage processing circuitry and memory 118 can sequentially write compressed versions of the blocks of data (called "data chunks") as log structured data onto fixed partitions of storage media (called "segments"), maintain information about the respective segments in the segment DB 120, and maintain information about any overwritten or unmapped data chunks (called "deleted data chunks") in the deleted chunk DB 112, while amortizing metadata updates due to associated data delete operations within the deleted chunk DB 112. In certain embodiments, the segment DB 120 can be implemented as a key-value store. As shown in FIG. 2, each entry 200 of the segment DB 120 can include a key having a field containing a segment identifier (ID) 202, as well as four (4) associated value fields containing a segment location 204, the total size (in bytes) of in-use ("active") chunks 206, a chunk map 208, and the latest clean time 210 for the identified segment, respectively. In certain embodiments, the deleted chunk DB 112 is likewise implemented as a key-value store, but is configured as a multi-level log structured merge (LSM) tree. As shown in FIG. 3, each entry 300 of the deleted chunk DB 112 can include a key having two (2) fields containing a segment ID 302 and a chunk ID 304, respectively, as well as two (2) value fields containing the chunk size 306 (in bytes) and a reference count 308, respectively.

The operation of the data storage system 106 for amortizing metadata updates due to data delete operations will be further understood with reference to the following illustrative example, as well as FIGS. 1-3, 4a, 4b, and 5a-5f. In this example, the storage processing circuitry and memory 118 (see FIG. 1) are operative to sequentially write at least a plurality of data chunks 0, 1, . . . , p (see FIG. 4a) and a plurality of data chunks 16, 1-modify, . . . , q (see also FIG. 4a) as log structured data onto at least a segment "0" and a segment "M", respectively. For example, the data chunks 0, 1, . . . , p can be sequentially written to the head of a log corresponding to the segment 0. Further, once the segment 0 becomes full, the head of the log can advance to an adjacent or non-adjacent segment with free storage space (e.g., the segment M), and subsequent data chunks (e.g., the data chunks 16, 1-modify, . . . , q) can be sequentially written to the head of the log corresponding to the segment M.

FIG. 4a depicts an exemplary data structure 402 of the segments 0, . . . , M, in which the data chunk 1 ("Chunk 1") is originally written onto the segment 0, and a modification of data chunk 1 ("Chunk 1-Modify") is subsequently written onto the segment M. For example, such a modification of the data chunk 1 can result when a corresponding location of the data chunk 1 in a virtual volume is overwritten or unmapped. Because the modification of data chunk 1 ("Chunk 1-Modify") is written onto the segment M, the data chunk 1 ("Chunk 1") that was originally written onto the segment 0 is no longer valid and can be regarded as a deleted data chunk. The status of the original data chunk 1 ("Chunk 1") as a deleted data chunk is indicated in FIG. 4a by a cross ("X") drawn through Chunk 1 within the segment 0.

For each data chunk (such as Chunk 1; see FIG. 4a) that obtains the status of a deleted data chunk on the segments 0, . . . , M, the storage processing circuitry and memory 118 stores metadata containing information about the deleted data chunk, namely, the segment ID 302, the chunk ID 304, the chunk size 306, and the reference count 308 (see FIG. 3). As described herein with reference to FIG. 3, the segment ID 302 and the chunk ID 304 correspond to two (2) key fields of the deleted chunk database entry 300, and the chunk size 306 and the reference count 308 correspond to two (2) value fields of the deleted chunk database entry 300. For example, once Chunk 1 (see FIG. 4a) obtains the status of a deleted data chunk within the segment 0, the segment ID 302 and the chunk ID 304 key fields in the corresponding deleted chunk database entry can be set to a first identifier (e.g., "0") for the segment 0 and a second identifier (e.g., "0.1") for Chunk 1, respectively. Further, the chunk size 306 and the reference count 308 value fields in the corresponding deleted chunk database entry can be set to the size (in bytes) of Chunk 1 and the number "1," respectively. It is noted that, if another deleted chunk database entry in the deleted chunk DB 112 currently exists with the same segment ID 302, then the reference counts 308 for the respective deleted chunk database entries can be summed to indicate the current total number (e.g., 2) of deleted data chunks on the segment having the segment ID 302.

Figure 4B:
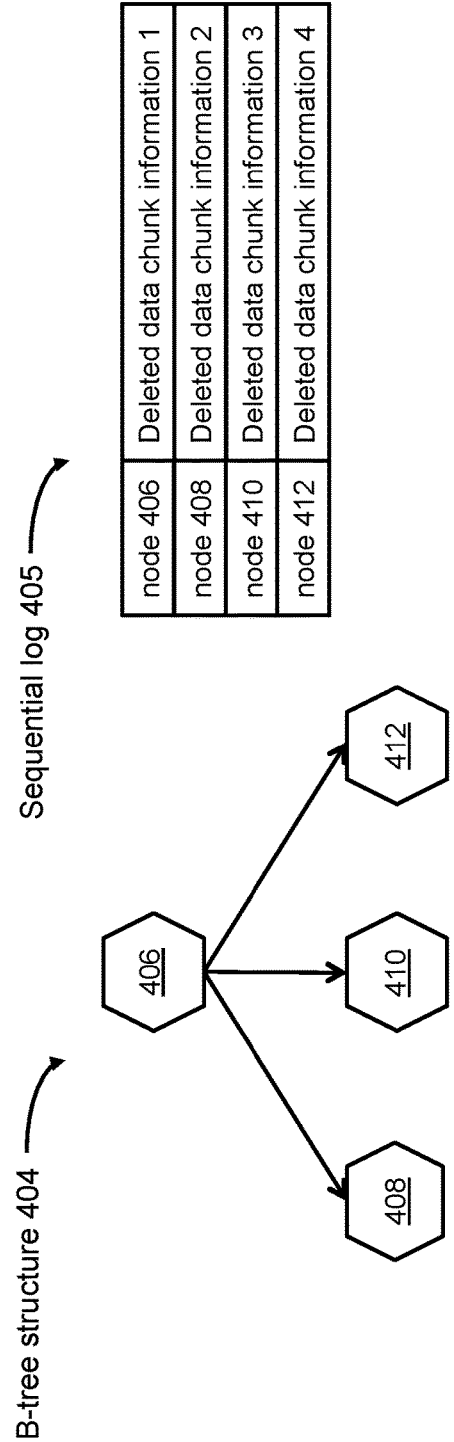
FIG. 4b is a diagram of an exemplary metadata structure configured as a b-tree of nodes containing information relating to the deleted data chunk(s) of FIG. 4a, and a sequential log containing such information relating to deleted data chunk(s) for each node of the b-tree.

In this example, the metadata containing information about the deleted data chunk (e.g., Chunk 1; see FIG. 4a), namely, the segment ID 302, the chunk ID 304, the chunk size 306, and the reference count 308, is inserted into a node of a b-tree structure 404 (see FIG. 4b), which is typically implemented in memory. As shown in FIG. 4b, the b-tree structure 404 can be configured as a b-tree of nodes 406, 408, 410, 412 (at least partially as depicted in FIG. 4b) or any other suitable structure. Each node of the b-tree structure 404 (e.g., the nodes 406, 408, 410, 412; see FIG. 4b) can include a header and an array of entries sorted by key (e.g., the segment ID 302, the chunk ID 304; see FIG. 3). Further, a binary search can be performed to search each node of the b-tree structure 404. Such information 1, 2, 3, 4 about deleted data chunk(s) (e.g., the segment ID 302, the chunk ID 304, the chunk size 306, the reference count 308) is also added, for the respective nodes of the b-tree structure 404, to a sequential log 405 (see FIG. 4b) implemented in persistent storage (e.g., a solid state device (SSD) storage or any other suitable persistent storage) of the deleted chunk DB 112.

Once the required storage space of the b-tree structure 404 reaches a predetermined size (or volume) threshold, further metadata insertions or other changes to the respective nodes 406, 408, 410, 412 of the b-tree structure 404 are prohibited (i.e., the b-tree structure is "frozen"), and subsequent insertions of metadata relating to deleted data chunks are made to nodes of a second b-tree structure (not shown) like the b-tree structure 404. It is noted that the storage processing circuitry and memory 118 can make such insertions of metadata into the nodes 406, 408, 410, 412 of the b-tree structure 404, as well as the nodes of the second b-tree structure, in DRAM or SRAM.

As described herein, the deleted chunk DB 112 is configured as a multi-level LSM-tree. In this example, the b-tree structure 404 and the second b-tree structure (not shown) described with reference to FIG. 4b can correspond to a logical $0^{th}$ level of the LSM-tree, and further logical levels (e.g., $1^{st}$ level, $2^{nd}$ level, $3^{rd}$ level, etc.) of the LSM-tree can be implemented within persistent storage (e.g., an SSD or any other suitable persistent storage) of the deleted chunk DB 112. Exemplary data merge operations and data flush operations performed by the storage processing circuitry and memory 118, in association with the deleted chunk DB 112 configured as the multi-level LSM-tree, are described below with reference to FIGS. 5a-5f.

Figure 5A:
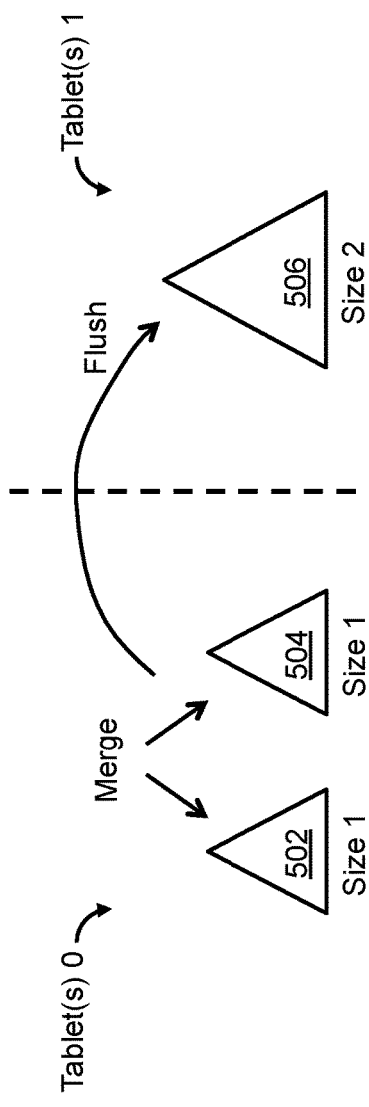
FIGS. 5a-5e are diagrams of exemplary data merge operations and exemplary data flush operations that can be performed in association with the deleted chunk DB of FIG. 1 configured as a log structured merge (LSM) tree.

FIGS. 5a-5e are diagrams of exemplary data merge operations and/or data flush operations that can be performed in association with the deleted chunk DB 112 (see FIG. 1) configured as the multi-level LSM-tree. In each of FIGS. 5a-5e, triangular representations of b-tree structures of various sizes are shown. It is noted that the size of each b-tree structure represents the volume of metadata contained in the b-tree structure. For purposes of illustration, the size of each b-tree structure is represented by an integer (1, 2, 4, 8, and so on), with increasing integer values representing increasing volumes of metadata. It is further noted that each b-tree structure shown in FIGS. 5a-5f is referred to herein as a "tablet." For example, FIG. 5a depicts a pair of tablets 502, 504 having size "1" ("Size 1"), and a single tablet 506 having size "2" ("Size 2"), which represents twice the volume of size 1. In addition, the size of a tablet corresponds to its logical level in the multi-level LSM-tree. For example, the pair of tablets 502, 504 having size 1 correspond to the $0^{th}$ logical level of the LSM-tree ("Tablet 0"), and the single tablet 506 having size 2 corresponds to the $1^{st}$ logical level of the LSM-tree ("Tablet 1"). Further, tablets having sizes 4, 8, and so on, correspond to the $2^{nd}$ level, $3^{rd}$ level, and so on, of the LSM-tree ("Tablet 2," "Tablet 3," and so on).

As described herein, once the required storage space of the b-tree structure 404 reaches the predetermined size (or volume) threshold, further metadata insertions or other changes to the respective nodes of the b-tree structure 404 are prohibited (i.e., the b-tree structure is "frozen"), and subsequent insertions of metadata relating to deleted data chunks are made to nodes of a second b-tree structure (not shown) like the b-tree structure 404. With reference to FIG. 5a, the b-tree structure 404 can be represented by the tablet "0" 502, and the second b-tree structure (not shown) can be represented by the tablet "0" 504. In this example, the predetermined size threshold of the respective tablets "0" is represented by the numeral "1" ("Size 1"). Further, an exemplary data merge (or compaction) policy of the data storage system 106 can state that, when two (2) tablets in any logical level (e.g., $0^{th}$ level, $1^{st}$ level, $2^{nd}$ level, $3^{rd}$ level, etc.) of the LSM-tree have similar sizes, then perform a data merge operation on the two (2) tablets.

As shown in FIG. 5a, the tablet "0" 502 and the tablet "0" 504 have each reached the predetermined size threshold of "1" ("Size 1") and therefore have similar sizes. To comply with the data merge (or compaction) policy of the data storage system 106, a data merge ("Merge"; see FIG. 5a) operation is performed on the tablet "0" 502 and the tablet "0" 504. It is noted that, in this example, all data insert operations and data merge operations performed on tablets "0" in the logical $0^{th}$ level of the LSM-tree take place in memory (reference numeral 118; see FIG. 1). It is noted that, in the case of memory loss, the tablets "0" in the logical $0^{th}$ level of the LSM-tree can be reconstructed using the information contained in the sequential log 405 (see FIG. 4b). Once the metadata contained in the tablets "0" 502, 504 are merged, the merged data is flushed ("Flush"; see FIG. 5a) or otherwise migrated to the persistent storage of the deleted chunk DB 112 to form a destination tablet, namely, the tablet "1" 506 having size "2" ("Size 2"), and the tablets "0" 502, 504 are discarded from memory.

Figure 5B:
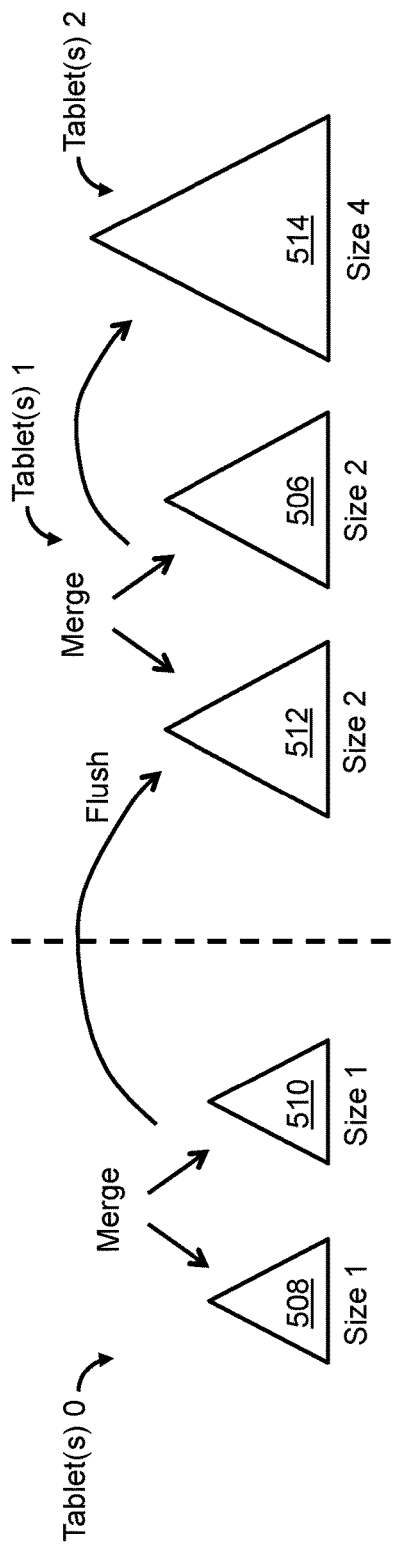

As additional metadata relating to deleted data chunks are generated, the metadata is inserted into nodes of a new b-tree structure in the logical $0^{th}$ level of the LSM-tree represented by a tablet "0" 508 (see FIG. 5b). Once the tablet "0" 508 has reached the predetermined size threshold of "1" ("Size 1"), subsequent insertions of metadata relating to deleted data chunks are made to nodes of a second b-tree structure in the logical $0^{th}$ level of the LSM-tree represented by a tablet "0" 510 (see FIG. 5b). As shown in FIG. 5b, the tablet "0" 508 and the tablet "0" 510 have each reached the predetermined size threshold of "1" ("Size 1") and therefore have similar sizes. To comply with the data merge (or compaction) policy of the data storage system 106, a data merge ("Merge"; see FIG. 5b) operation is performed on the tablet "0" 508 and the tablet "0" 510. Once the metadata contained in the tablets "0" 508, 510 are merged, the merged metadata is flushed ("Flush"; see FIG. 5b) or otherwise migrated to the persistent storage of the deleted chunk DB 112 to form another destination tablet, namely, the tablet "1" 512 ("Size 2"), and the tablets "0" 508, 510 are discarded from memory. As further shown in FIG. 5b, the tablet "1" 506 and the tablet "1" 512 stored in the deleted chunk DB 112 have similar sizes, namely, size "2" ("Size 2"). Accordingly, to further comply with the data merge (compaction) policy, a data merge ("Merge"; see FIG. 5b) operation is performed on the tablet "1" 506 and the tablet "1" 512 to form, in the deleted chunk DB 112, still another destination tablet, namely, a tablet "2" 514 having size "4" ("Size 4"), which represents twice the volume of size 2. The tablets "2" 506, 512 are then discarded from the deleted chunk DB 112.

Figure 5C:
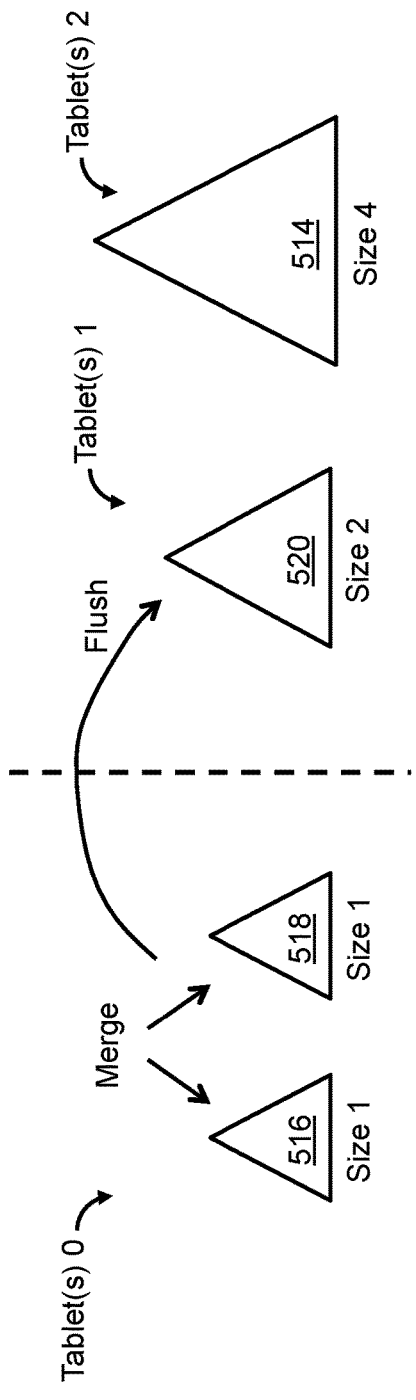

As yet additional metadata relating to deleted data chunks are generated, the data insert operations, the data merge operations, and the data flush operations described herein with reference to FIGS. 5a and 5b can be repeated for new tablets "0", as well as higher level tablets "1", "2", "3", and so on. For example, as shown in FIG. 5c, such additional metadata can first be inserted into a tablet "0" 516 until the predetermined size threshold "1" ("Size 1") is reached, and then into a tablet "0" 518 until the predetermined size threshold "1" ("Size 1") is reached, resulting in the tablets "0" 516, 518 having similar sizes. The metadata contained in the tablets "0" 516, 518 can then be merged and flushed from memory to the deleted chunk DB 112 to form yet another destination tablet, namely, a tablet "1" 520 having size "2" ("Size 2"), and the tablets "0" 516, 518 can be discarded from memory. As further shown in FIG. 5c, the tablet "1" 520 having size "2" ("Size 2") is stored in the deleted chunk DB 112 with the tablet "2" 514 having size "4" ("Size 4"). However, because the tablet "1" 514 and the tablet "2" 520 do not have similar sizes, the metadata contained in the tablet "1" 514 and the tablet "2" 520 are not merged.

Figure 5D:
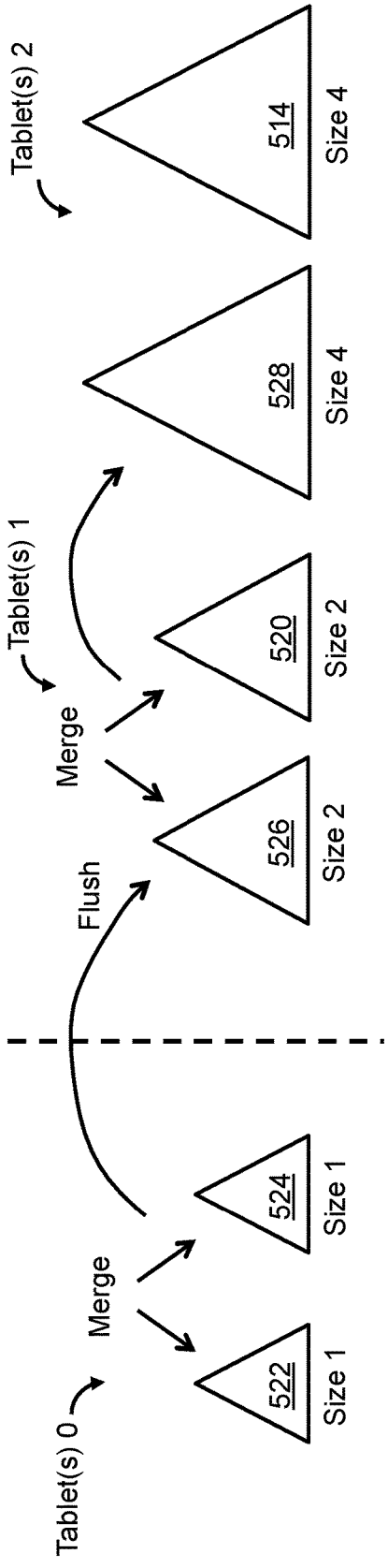
Figure 5E:
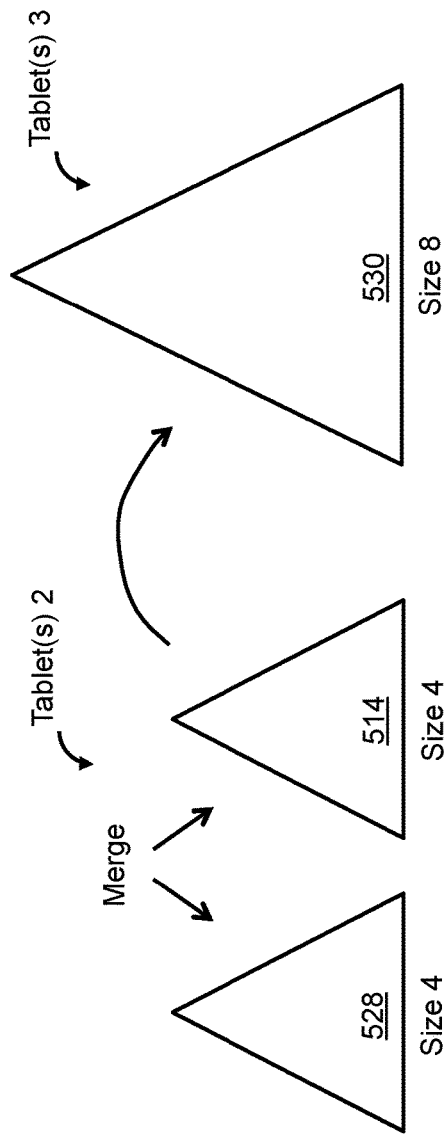

As shown in FIG. 5d, such additional metadata can be further inserted first into a tablet "0" 522 until the predetermined size threshold "1" ("Size 1") is reached, and then into a tablet "0" 524 until the predetermined size threshold "1" ("Size 1") is reached, resulting in the tablets "0" 522, 524 having similar sizes. The metadata contained in the tablets "0" 522, 524 can therefore be merged and flushed from memory to the deleted chunk DB 112 to form still yet another destination tablet, namely, a tablet "1" 526 having size "2" ("Size 2"), and the tablets "0" 522, 524 can be discarded from memory. Because the tablet "1" 526 and the tablet "1" 520 have similar sizes (i.e., "Size 2"), the metadata contained in the tablets "1" 520, 526 can be merged to form, in the deleted chunk DB 112, another destination tablet, namely, a tablet "2" 528 having size "4" ("Size 4"), and the tablets "1" 520, 526 can be discarded from the deleted chunk DB 112. In addition, because the tablet "2" 514 and the tablet "2" 528 also have similar sizes (i.e., "Size 4"), the metadata contained in the tablets "2" 514, 528 can be merged to form still another destination tablet, namely, a tablet "3" 530 (see FIG. 5e) having size "8" ("Size 8"), which represents twice the volume of size 4. The tablets "2" 514, 528 can then be discarded from the deleted chunk DB 112. It is noted that such data insert operations, data merge operations, and data flush operations described herein with reference to FIGS. 5a-5e can be repeated, if required and/or desired, as additional metadata relating to deleted data chunks are generated.

Figure 5F:
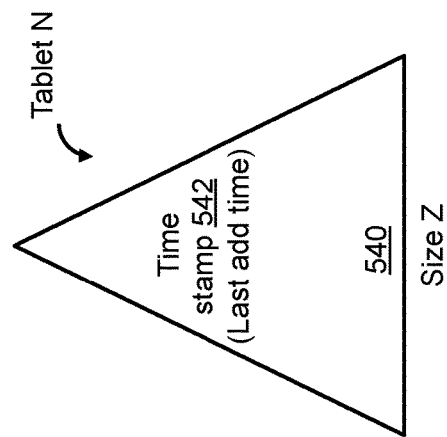
FIG. 5f is a block diagram of an exemplary metadata structure ("tablet") employed in the data merge operations and the data flush operations of FIGS. 5a-5e, the tablet containing an associated time stamp.

FIG. 5f depicts a generalized b-tree structure, i.e., a tablet "N" (N=0, 1, 2, 3, and so on) 540 having size "Z" ("Size Z"; Z=1, 2, 4, 8, and so on), which can be employed in the data insert operations, the data merge operations, and/or the data flush operations of FIGS. 5a-5e. As shown in FIG. 5f, the tablet "N" 540 has an associated time stamp 542 ("Last add time"), which can be stored with metadata within the tree structure of the tablet "N" 540. As described herein with reference to FIG. 4a, once Chunk 1 obtained the status of a deleted data chunk within the segment 0, the segment ID 302 and the chunk ID 304 key fields in the corresponding deleted chunk database entry were set to the first identifier (e.g., "0") for the segment 0 and the second identifier (e.g., "0.1") for Chunk 1, respectively. Further, the chunk size 306 and the reference count 308 value fields in the corresponding deleted chunk database entry were set to the size (in bytes) of Chunk 1 and the number "1," respectively. Once such a deleted chunk database entry is inserted into a tablet "0" in memory, the time stamp ("Last add time"; see FIG. 5f) stored in the tablet "0" can be set to a current time at which the insertion of the deleted chunk database entry was made.

Exemplary pseudo code ("MergeTablets( )") is provided below for performing data merge operations such as those described herein with reference to FIGS. 5a-5e. In the exemplary pseudo code ("MergeTablets( )") below, it is noted that "DcdbTabletM0" and "DcdbTabletM1" can each refer to tablets at any level of the LSM-tree implemented by the deleted chunk DB ("Dcdb") 112. It is further noted that "Cursors" refers to a software construct used to make ordered traversals of the segment DB 120 and the deleted chunk DB 112 during the data merge operations.

```
Struct DcdbEntry
{
  SegmentID
  ChunkID
  ChunkSize
// "RefCount" corresponds to "Reference count".
  RefCount
}
MergeTablets( )
{
  // Set up cursors to traverse the three tables in order
  // from lowest key value to highest.
  Cursors[0] = DcdbTabletM0.first( )
  Cursors[1 ] = DcdbTabletM1. first( )
  // Start the destination tablet.
  NewDcdbTablet = new Tablet( );
  While(any cursor is not complete)
  {
    // Advance the cursors if deleted chunk DB entries must be
      // ignored because segment cleaning has already applied them.
    For each tablet
    {
      While (SegmentDb[cursor[tablet].SegmentID].
         LatestCleanTime > Tablet.LastAddTime)
         Cursor[tablet].advance
    }
    // Determine whether to update the segment DB. The higher
    // the tablet level, the better the amortization.
      Bool DoUpdateSegment =
         TabletLevelN == SegmentDbUpdateLevel;
      MergeCursors(NewDcdbTablet,
         Cursors,
         SegmentDb,
         DoUpdateSegment);
  // Set the LastAddTime on the destination tablet to the latest
  LastAddTime
  // from the source tablets.
    NewDcdbTablet.LastAddTime = Max(DcdbTabletM0.LastAddTime,
         DcdbTabletM1.LastAddTime);
  Delete DcdbTabletM0
  Delete DcdbTabletM1
}
MergeCursors(NewDcdbTablet, Cursors[2], SegmentDb,
DoUpdateSegment)
{
  // Find the cursor(s) with the lowest {SegmentID, ChunkID}.
  // There can be more than one (1) with the same lowest value.
  DcdbEntryMin = min(Cursors [ ].SegmentID, Cursors [ ].ChunkID);
  // Merge the contents and write to the NewDcdbTablet.
  DcdbEntry newEntry;
  newEntry.SegmentID = DcdbEntryMin.SegmentID;
```

-continued

```
  newEntry.ChunkID = DcdbEntryMin.ChunkID;
  newEntry.ChunkSize = Cursors[DcdbEntryMin].ChunkSize;
  // Sum the reference counts of the cursors that share the same
  // lowest {SegmentID, ChunkID}.
  newEntry.RefCount = Sum(Cursors[DcdbEntryMin].RefCount);
  // Append the newEntry to the destination tablet.
  DcdbTablet.Append(newEntry);
  // Perform an amortized update to the segment DB at the
  // selected tablet level.
  If(DoUpdateSegment == True)
  {
     SegmentDb [DcdbEntryMin.SegmentID].inUseBytes -=
     newEntry.ChunkSize;
         // Update the Deleted Chunk Accounting DB if
         // inUseBytes passes a given threshold.
         If (SegmentDb[DcdbEntryMin.SegmentID].inUseBytes <
           cleanThreshold
         DeletedChunkAccountingDb.update(DcdbEntryMin.SegmentID)
  }
  // Advance the cursors that were found above, not the ones
  // that did not have the lowest {SegmentID, ChunkID}.
  DcbdEntryCursors[DcdbEntryMin].advance( );
}
```

In the foregoing pseudo code ("MergeTablets( )") for performing data merge operations, it is noted that, if two or more deleted chunk DB entries have the same key (segment ID 302, chunk ID 304; see FIG. 3), then one or the other deleted chunk DB entry is included in the destination tablet ("NewDcdbTablet"). Further, the reference count (reference count 308; see FIG. 3) values for the two or more deleted chunk DB entries are summed, and the resulting summed value is provided as the reference count for the most recent deleted chunk DB entry. The chunk size value (chunk size 306; see FIG. 3) for the most recent deleted chunk DB entry remains unchanged. It is further noted that the latest clean time (latest clean time 210; see FIG. 2) of the segment corresponding to the deleted chunk DB entry is compared with the last add time (time stamp 542; see FIG. 5f) of the tablet in which the deleted data chunk resides, and, if the latest clean time of the segment is greater than the last add time of the tablet, then the deleted chunk DB entry is omitted from the data merge operation.

With regard to the foregoing pseudo code ("MergeTablets( )"), it is still further noted that, for improved amortization, the segment DB 120 can be updated ("DoUpdateSegment") at a level of the LSM-tree where the number of deleted chunk DB entries in a respective tablet relative to the total number of node entries in the segment DB 120 is greater than a predetermined value, such as eight (8) or any other suitable value. For example, for each segment DB entry 200 (see FIG. 2), the chunk map 208 can be stored separate from the remaining key/value fields (segment ID 202, segment location 204, total size of in-use chunks 206, latest clean time 210; see FIG. 2). Further, the remaining key/value fields of the segment DB entry 200 can typically occupy sixteen (16) bytes (or any other suitable number of bytes). In certain embodiments, the nodes of the segment DB 120 can typically occupy 4,096 bytes (or any other suitable number of bytes), and each node of the segment DB 120 can typically contain about 256 segment DB entries (or any other suitable number of entries). In addition, the array of storage devices 116 (see FIG. 1) can typically provide 256 Terabytes of physical storage, the average size of a data chunk can typically be 2,048 bytes, and the size of each segment can typically be four (4) Megabytes. Based on these typical values, the array of storage devices 116 can store up to 128 binary billion data chunks, and each segment can include up to an average of 2,048 data chunks. Further, the array of storage devices 116 can store up to 64 binary million segments, and the segment DB 120 can have up to 256 binary thousand nodes. Accordingly, to obtain improved amortization at the level of the LSM-tree where the number of deleted chunk DB entries in a respective tablet relative to the total number of node entries in the segment DB 120 is greater than eight (8), the segment DB 120 can be updated ("DoUpdateSegment") at times when the deleted chunk DB 112 contains 64 binary million deleted chunk DB entries, which is less than about two thousandths of the total number of data chunks that the data storage system 106 can support.

In this example, selected segments containing deleted data chunks can be effectively "cleaned" to recover storage space consumed by the deleted data chunks. Such cleaning of segments can include selecting a segment with a large (or the largest) amount of storage space occupied by deleted data chunks, copying any in-use (or active) data chunks from the selected segment to a new segment, and maintaining the remaining storage space in the selected segment as being available for storing other sequentially written data chunks.

Exemplary pseudo code ("CleanSegment( )") is provided below for cleaning such a selected segment. In the exemplary pseudo code ("CleanSegment( )") below, it is noted that "VictimSegment" refers to the segment selected for cleaning, "NewSegment" refers to the fresh segment to which valid data chunks are copied, and "DcdbCursors" and "ChunkCursor" refer to software constructs used to make ordered traversals of the deleted chunk DB 112 and the selected segment, respectively, during such segment cleaning. It is further noted that the cleaning of the selected segment can be performed, as required and/or desired, by the storage processing circuitry and memory 118 (see FIG. 1) as a background process within the data storage system 106.

```
CleanSegment(VictimSegment, NewSegment)
{
    DcdbCursors[ ]
    // Set up cursors.
For each frozen tablet in the Dcdb
{
    // If tablet is young enough to possibly have entries that
    // are in the victim segment.
    If (tablet.LastAddTime > VictimSegment.LatestCleanTime)
    // Add a new cursor that starts at the victim segment.
VictimSegment ID
        DcdbCursors.add(tablet.find(Victim Segment. SegmentID))
    // Set up a cursor to the chunks in the victim segment.
    ChunkCursor = SegmentDb.find(VictimSegment.SegmentID).
    ChunkMap;
For entire segment
{
    For each DcdbCursors
    If (ChunkCursor.ChunkID == DcdbCursor.ChunkID)
    {
        // Chunk may be deleted.
        ChunkCursor.chunk.RefCount -=
            DcdbCursor.RefCount;
        If (ChunkCursor.RefCount == 0)
        {
            // Chunk is to be deleted.
            ChunkCursor.advance( )
            Go to next ChunkID
        }
    }
    // Chunk is not deleted. Add the chunk to the new segment.
    NewSegment.add(ChunkCursor);
    ChunkCursor.advance( );
}
}
Delete VictimSegment
NewSegment.LatestCleanTime = YoungestTablet.lastAddTime;
}
```

In the foregoing pseudo code ("CleanSegment( )") for cleaning segments, it is noted that the "VictimSegment" (i.e., the segment selected for cleaning) can be determined by identifying a segment with a large (or the largest) amount of storage space occupied by deleted data chunks, which can correspond to the segment DB entry having a low (or the lowest) value of the total size of in-use chunks 206 (see FIG. 2). It is further noted that such cleaning of segments generally involves a comparison of the segment DB entry for the selected segment ("VictimSegment") with one or more deleted chunk DB entries of the deleted chunk DB 112. The deleted chunk DB entries involved in the comparison can correspond to one or more deleted chunk DB entries contained in frozen tablets; i.e., tablets for which further metadata insertions or other changes are prohibited. Such frozen tablets can correspond to those having received one or more deleted chunk DB entries since the most recent time the selected segment has been cleaned, which can be determined by comparing the last add times (time stamp 542; see FIG. 5f) of the frozen tablets against the latest clean time (latest clean time 210; see FIG. 2) of the selected segment.

In this example, ordered traversals of the deleted chunk DB 112 and the selected segment ("VictimSegment") can then performed to identify each data chunk in the selected segment that has the status of a deleted data chunk. Such an ordered traversal of the selected segment can involve a traversal of the chunk map (chunk map 208; see FIG. 2) in the segment DB entry for the selected segment. For each data chunk identified as having the status of a deleted data chunk, the reference count (reference count 308; see FIG. 3) in the deleted chunk DB entry for the identified data chunk is decremented by one (1), and, if the resulting reference count for the deleted chunk DB entry is zero (0), then the cleaning of the selected segment can be deemed to be completed. Upon completion of the cleaning of the selected segment, the latest clean time (latest clean time 210; see FIG. 2) of the new segment containing the in-use (or active) data chunks from the selected segment is set to the last add time (time stamp 542; see FIG. 5f) of the most recently formed (or "youngest") tablet.

Figure 6:
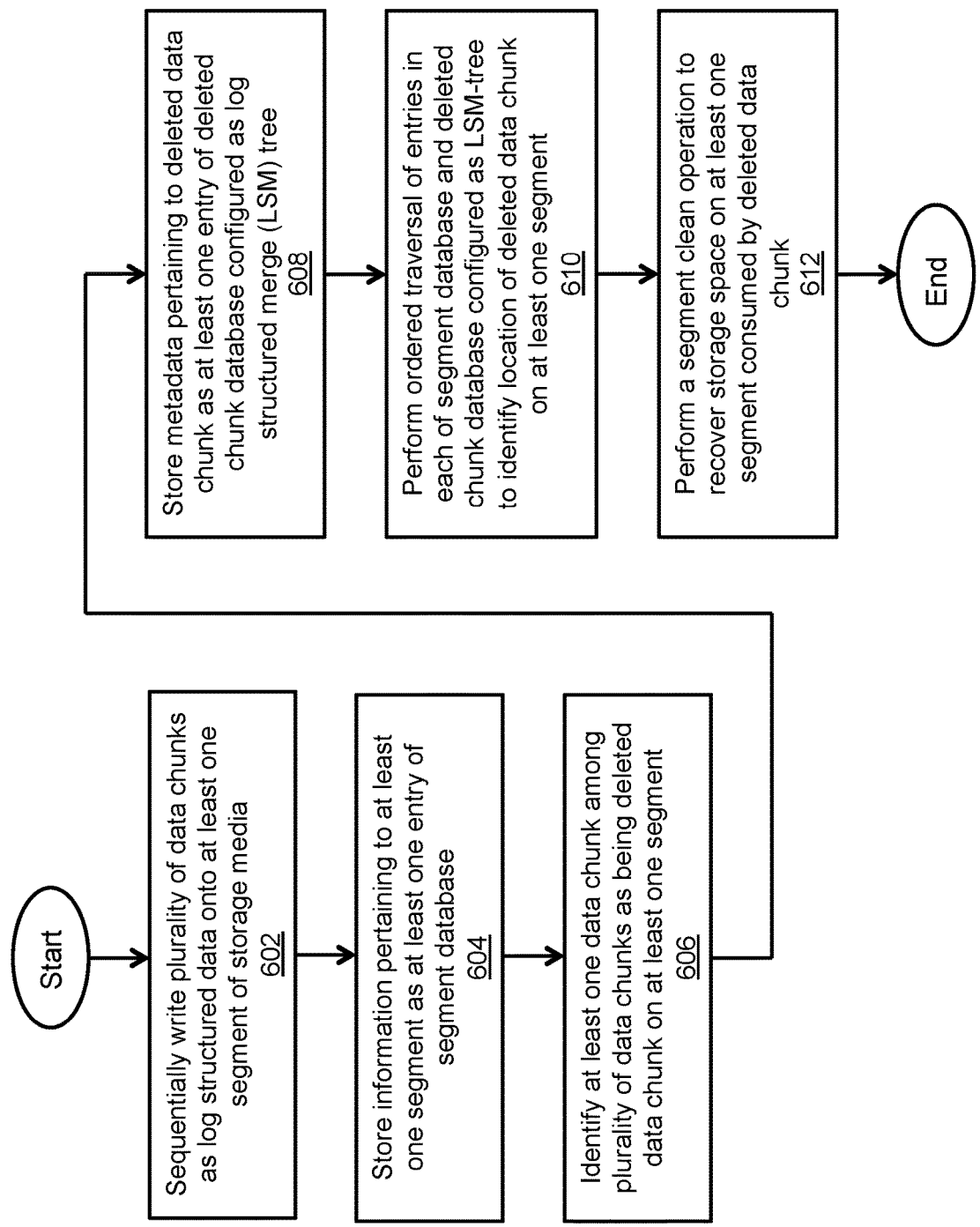
FIG. 6 is a flow diagram of an exemplary method of amortizing metadata updates due to data delete operations within the data storage system of FIG. 1.

A method of amortizing metadata updates due to data delete operations in a data storage system is described below with reference to FIG. 6. As depicted in block 602, a plurality of data chunks are sequentially written as log structured data onto at least one segment of storage media. As depicted in block 604, information pertaining to the at least one segment is stored as at least one entry of a segment database. As depicted in block 606, at least one data chunk among the plurality of data chunks is identified as being a deleted data chunk on the at least one segment. As depicted in block 608, metadata pertaining to the deleted data chunk is stored as at least one entry of a deleted chunk database configured as a log structured merge (LSM) tree. As depicted in block 610, an ordered traversal of entries in each of the segment database and the deleted chunk database configured as the LSM-tree is performed to identify a location of the deleted data chunk on the at least one segment. As depicted in block 612, a segment clean operation is performed to recover storage space on the at least one segment consumed by the deleted data chunk.

Having described the above illustrative embodiments of the disclosed systems and methods, other alternative embodiments and/or variations may be made. For example, it was described herein that the storage processing circuitry and memory 118 could sequentially write data chunks as log structured data onto fixed partitions of storage media referred to herein as "segments". In certain alternative embodiments, such segments need not be of fixed size and mapped to specific locations on the storage media. Rather, the segments can be logical and stored at various different physical locations on the storage media. In such alternative embodiments, the victim segment (i.e., the segment selected in the segment clean operation) and the new segment (i.e., the segment containing in-use or active data chunks from the selected segment) can be the same segment in its old and new physical locations on the storage media.

It was further described herein that a pair of tablets "0" can be employed in the $0^{th}$ logical level of the LSM-tree configuration of the deleted chunk DB 112. In certain alternative embodiments, the deleted chunk DB 112 can accommodate more than two (2) (e.g., many) tablets "0" in the $0^{th}$ logical level of the LSM-tree. In such certain alternative embodiments, multiple concurrent processing threads using round robin logic can be employed to select a tablet "0" from among a set of many tablets "0" to prevent contention over the respective tablets "0". Further, once each of the tablets "0" in the set of tablets "0" reaches the predetermined size (or volume) threshold, each tablet "0" can be deemed to be frozen, and a new set of tablets "0" can be generated. Cursors can also be employed to make ordered traversals of the respective tablets "0" in the frozen set of tablets "0" during data merge operations.

It was still further described herein that the "VictimSegment" (i.e., the segment selected for cleaning) could be determined by identifying a segment with a large (or the largest) amount of storage space occupied by deleted data chunks. In certain alternative embodiments, the number of deleted data chunks in each of a plurality of segments can be tracked and stored as an entry in the deleted chunk accounting DB 114 (see FIG. 1), and the "Victim Segment" can be determined by identifying the segment with the greatest number of deleted data chunks, as indicated by entries of the deleted chunk accounting DB 114.

It was still further described herein that the ratio of tablet sizes from the $N^{th}$ logical level to the $(N+1)^{th}$ logical level of an LSM-tree is 1:2. In certain alternative embodiments, any other suitable ratio of tablet sizes from the $N^{th}$ logical level to the $(N+1)^{th}$ logical level of the LSM-tree may be employed.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of amortizing metadata updates due to data delete operations in a data storage system, comprising:
    writing a plurality of data chunks as log structured data onto at least one segment of a virtual volume;
    storing information pertaining to the at least one segment as at least one entry of a segment database;
    identifying at least one data chunk among the plurality of data chunks written as log structured data onto the at least one segment of the virtual volume, the identified at least one data chunk being a deleted data chunk on the at least one segment;
    storing metadata pertaining to the deleted data chunk as at least one entry of a deleted chunk database configured as a log structured merge (LSM) tree;
    performing an ordered traversal of entries in the segment database and entries in the deleted chunk database configured as the LSM-tree to identify a location of the deleted data chunk on the at least one segment; and
    performing a segment clean operation to recover storage space on the at least one segment consumed by the deleted data chunk, the LSM-tree being a multi-level LSM-tree including a plurality of levels, and the data storage system including a memory,
    wherein the storing of the metadata pertaining to the deleted data chunk includes:
        inserting the metadata pertaining to the deleted data chunk into a first metadata tablet at a first respective level from among the plurality of levels of the multi-level LSM-tree within the memory;
        upon the first metadata tablet at the first respective level of the multi-level LSM-tree reaching a predetermined size threshold, prohibiting insertion of additional metadata pertaining to one or more deleted data chunks into the first metadata tablet; and
        inserting the additional metadata pertaining to the one or more deleted data chunks into a second metadata tablet at the first respective level of the multi-level LSM-tree within the memory, and
    wherein the performing of the ordered traversal of the entries in the segment database and the entries in the deleted chunk database includes performing the ordered traversal at the first respective level of the multi-level LSM-tree where a first number of deleted data chunks in one of the first metadata tablet and the second metadata tablet relative to a total number of the entries in the segment database is greater than a predetermined value.

2. The method of claim 1 wherein the storing of the metadata pertaining to the deleted data chunk further includes, upon the second metadata tablet at the first respective level of the multi-level LSM-tree reaching the predetermined size threshold, performing a data merge operation on the first and second metadata tablets within the memory to form a third metadata tablet at a second respective level from among the plurality of levels of the multi-level LSM-tree.

3. The method of claim 2 further comprising:
    performing a data flush operation on the third metadata tablet at the second respective level of the multi-level LSM-tree to migrate the third metadata tablet from the memory to persistent storage of the deleted chunk database.

4. The method of claim 2 wherein the deleted chunk database is a key/value store, wherein the at least one entry of the deleted chunk database has a key and a corresponding reference count that is initialized to one, and wherein the performing of the data merge operation on the first and second metadata tablets includes, in the event two or more entries of the deleted chunk database within the first and second metadata tablets have the same key, summing reference counts corresponding to the two or more entries of the deleted chunk database to obtain a reference count sum, and adding one of the two or more entries with the reference count sum to the third metadata tablet.

5. The method of claim 2 wherein the segment database is a key/value store, wherein the at least one entry of the segment database has a key and at least one corresponding value, wherein the at least one corresponding value includes a latest clean time of the at least one segment, wherein the third metadata tablet has an associated time stamp indicating a last add time when an entry of the deleted chunk database was last added to the third metadata tablet, and wherein the performing of the data merge operation on the first and second metadata tablets includes, in the event the latest clean time of the at least one segment is greater than the last add time of the third metadata tablet, omitting the entry of the deleted chunk database from the third metadata tablet.

6. The method of claim 2 wherein the performing of the ordered traversal of the entries in the segment database and the entries in the deleted chunk database includes performing the ordered traversal at the second respective level of the multi-level LSM-tree where a second number of deleted data chunks in the third metadata tablet relative to the total number of the entries in the segment database is greater than the predetermined value.

7. The method of claim 1 wherein the performing of the segment clean operation to recover the storage space on the at least one segment includes identifying the at least one segment based at least in part on an amount of storage space occupied by deleted data chunks.

8. The method of claim 7 wherein the data storage system includes a deleted chunk accounting database having a plurality of entries, each entry of the deleted chunk accounting database including a second number of deleted data chunks in a respective segment of the virtual volume, and wherein the identifying of the at least one segment based at least in part on the amount of storage space occupied by deleted data chunks includes identifying the at least one segment with a greatest number of deleted data chunks, as indicated by the plurality of entries of the deleted chunk accounting database.

9. The method of claim 7 wherein the performing of the segment clean operation to recover the storage space on the at least one segment further includes comparing the at least one entry of the segment database for the identified at least one segment against the at least one entry of the deleted chunk database configured as the LSM-tree.

10. The method of claim 9 wherein the comparing of the at least one entry of the segment database for the identified at least one segment against the at least one entry of the deleted chunk database includes performing ordered traversals of the deleted chunk database and the identified at least one segment to identify each data chunk on the identified at least one segment having a status of the deleted data chunk.

11. The method of claim 1 wherein the segment database is a first key/value store, wherein the at least one entry of the first key/value store has a key field and a value field, wherein the key field of the first key/value store includes a segment identifier of the at least one segment, and wherein the value field of the first key/value store includes a chunk map of the respective data chunks written to the at least one segment.

12. The method of claim 11 wherein the deleted chunk database is a second key/value store, wherein the at least one entry of the second key/value store has a first key field, a second key field, and a value field, wherein the first key field includes the segment identifier, wherein the second key field includes a chunk identifier of the at least one data chunk, and wherein the value field of the second key/value store includes a reference count of a total number of deleted data chunks on the at least one segment having the segment identifier.

13. The method of claim 12 wherein the performing of the ordered traversal of the entries in the segment database and the entries in the deleted chunk database includes performing the ordered traversal in the first key/value store and the second key/value store to identify a location of the deleted data chunk on the at least one segment based at least on the segment identifier, the chunk identifier, the chunk map, and the reference count.

14. A system for amortizing metadata updates due to data delete operations in a data storage system, comprising:
 storage processing circuitry;
 a memory;
 a segment database;
 a deleted chunk database configured as a log structured merge (LSM) tree; and
 an array of storage devices configured for log structured data storage of virtual volumes,
 wherein the storage processing circuitry is operative to execute a computer program out of the memory:
  to write a plurality of data chunks as log structured data onto at least one segment of a virtual volume;
  to store information pertaining to the at least one segment as at least one entry of the segment database;
  to identify at least one data chunk among the plurality of data chunks written as log structured data onto the at least one segment of the virtual volume, the identified at least one data chunk being a deleted data chunk on the at least one segment;
  to store metadata pertaining to the deleted data chunk as at least one entry of the deleted chunk database configured as the LSM-tree;
  to perform an ordered traversal of entries in the segment database and entries in the deleted chunk database configured as the LSM-tree to identify a location of the deleted data chunk on the at least one segment; and
  to perform a segment clean operation to recover storage space on the at least one segment consumed by the deleted data chunk,
 wherein the LSM-tree is a multi-level LSM-tree including a plurality of levels, and
 wherein the storage processing circuitry is further operative to execute the computer program out of the memory:
  to insert the metadata pertaining to the deleted data chunk into a first metadata tablet at a first respective level from among the plurality of levels of the multi-level LSM-tree within the memory;
  upon the first metadata tablet at the first respective level of the multi-level LSM-tree reaching a predetermined size threshold, to prohibit insertion of additional metadata pertaining to one or more deleted data chunks into the first metadata tablet; and
  to insert the additional metadata pertaining to the one or more deleted data chunks into a second metadata tablet at the first respective level of the multi-level LSM-tree within the memory, and
 wherein performing the ordered traversal of the entries in the segment database and the entries in the deleted chunk database includes performing the ordered traversal at the first respective level of the multi-level LSM-tree where a first number of deleted data chunks in one of the first metadata tablet and the second metadata tablet relative to a total number of the entries in the segment database is greater than a predetermined value.

15. The system of claim 14 wherein the storage processing circuitry is further operative to execute the computer program out of the memory, upon the second metadata tablet at the first respective level of the multi-level LSM-tree reaching the predetermined size threshold, to perform a data merge operation on the first and second metadata tablets within the memory to form a third metadata tablet at a second respective level from among the plurality of levels of the multi-level LSM-tree.

16. The system of claim 15 wherein the storage processing circuitry is further operative to execute the computer program out of the memory to perform a data flush operation on the third metadata tablet at the second respective level of the multi-level LSM-tree to migrate the third metadata tablet from the memory to persistent storage of the deleted chunk database.

17. The system of claim 14 wherein the data storage system further includes a deleted chunk accounting database having a plurality of entries, each entry of the deleted chunk accounting database including a second number of deleted data chunks in a respective segment of the virtual volume, and wherein the storage processing circuitry is further operative to execute the computer program out of the memory to identify the at least one segment with a greatest number of deleted data chunks, as indicated by the plurality of entries of the deleted chunk accounting database.

18. The system of claim 17 wherein the storage processing circuitry is further operative to execute the computer program out of the memory to compare the at least one entry of the segment database for the identified at least one segment against the at least one entry of the deleted chunk database configured as the LSM-tree.

19. The system of claim 18 wherein the storage processing circuitry is further operative to execute the computer program out of the memory perform ordered traversals of the deleted chunk database and the identified at least one segment to identify each data chunk on the identified at least one segment having a status of the deleted data chunk.

20. A computer program product having a non-transitory computer readable medium that stores a set of instructions to amortize metadata updates due to data delete operations in a data storage system, the set of instructions, when carried out by computerized circuitry, causing the computerized circuitry to perform a method of:

writing a plurality of data chunks as log structured data onto at least one segment of a virtual volume;

storing information pertaining to the at least one segment as at least one entry of a segment database;

identifying at least one data chunk among the plurality of data chunks written as log structured data onto the at least one segment of the virtual volume, the identified at least one data chunk being a deleted data chunk on the at least one segment;

storing metadata pertaining to the deleted data chunk as at least one entry of a deleted chunk database configured as a log structured merge (LSM) tree;

performing an ordered traversal of entries in the segment database and entries in the deleted chunk database configured as the LSM-tree to identify a location of the deleted data chunk on the at least one segment; and performing a segment clean operation to recover storage space on the at least one segment consumed by the deleted data chunk, the LSM-tree being a multi-level LSM-tree including a plurality of levels, and the data storage system including a memory, wherein the storing of the metadata pertaining to the deleted data chunk includes:
  inserting the metadata pertaining to the deleted data chunk into a first metadata tablet at a first respective level from among the plurality of levels of the multi-level LSM-tree within the memory;
  upon the first metadata tablet at the first respective level of the multi-level LSM-tree reaching a predetermined size threshold, prohibiting insertion of additional metadata pertaining to one or more deleted data chunks into the first metadata tablet; and
  inserting the additional metadata pertaining to the one or more deleted data chunks into a second metadata tablet at the first respective level of the multi-level LSM-tree within the memory, and wherein the performing of the ordered traversal of the entries in the segment database and the entries in the deleted chunk database includes performing the ordered traversal at the first respective level of the multi-level LSM-tree where a first number of deleted data chunks in one of the first metadata tablet and the second metadata tablet relative to a total number of the entries in the segment database is greater than a predetermined value.

* * * * *